(12) United States Patent
Iourcha et al.

(10) Patent No.: US 7,643,679 B2
(45) Date of Patent: Jan. 5, 2010

(54) METHOD AND APPARATUS FOR BLOCK BASED IMAGE COMPRESSION WITH MULTIPLE NON-UNIFORM BLOCK ENCODINGS

(75) Inventors: Konstantine Iourcha, San Jose, CA (US); Andrew S. C. Pomianowski, Palo Alto, CA (US); Raja Koduri, Santa Clara, CA (US)

(73) Assignee: ATI Technologies ULC, Markham, Ontario (CA)

( * ) Notice: Subject to any disclaimer, the term of this patent is extended or adjusted under 35 U.S.C. 154(b) by 550 days.

(21) Appl. No.: 10/778,902

(22) Filed: Feb. 13, 2004

(65) Prior Publication Data

US 2004/0228527 A1 Nov. 18, 2004

Related U.S. Application Data

(60) Provisional application No. 60/447,862, filed on Feb. 13, 2003.

(51) Int. Cl.
*G06K 9/36* (2006.01)
(52) U.S. Cl. .................. 382/166; 382/232; 382/233; 382/244; 382/239
(58) Field of Classification Search ............. 382/232, 382/233, 243, 240, 168, 270, 239, 166, 236, 382/244, 245, 238, 246, 247; 358/1.3, 1.8, 358/1.9, 2.99, 466; 375/240.11, 240.25, 375/240.12, 240.26, 240.1, E7.094, 240.24, 375/E7.047, E7.049; 345/555, 545; 711/118; 347/11, 20; 341/50; 342/54, 123
See application file for complete search history.

(56) References Cited

U.S. PATENT DOCUMENTS

| 4,580,134 A | 4/1986 | Campbell et al. ........... 345/589 |
| 4,821,208 A | 4/1989 | Ryan et al. .................. 345/550 |
| 4,887,151 A | 12/1989 | Wataya ....................... 358/539 |

(Continued)

FOREIGN PATENT DOCUMENTS

JP 5216993 8/1993

(Continued)

OTHER PUBLICATIONS

Belur V. Dasarathy; Image Data Compression—Block Truncation Coding; IEEE; pp. 55-121; Los Alamitos, California.

(Continued)

*Primary Examiner*—Anh Hong Do
(74) *Attorney, Agent, or Firm*—Vedder Price, P.C.

(57) ABSTRACT

Embodiments of the present invention are directed to a method and apparatus for block based image compression with multiple non-uniform block encodings. In one embodiment, an image is divided into blocks of pixels. In one embodiment the blocks are four pixels by four pixels, but other block sizes are used in other embodiments. In one embodiment, a block of pixels in the original image is compressed using two different methods to produce a first and second compressed block. Thus, each block in the original image is represented by two, typically different, compressed blocks. In one embodiment, color associated with a pixel is determined by combining the compressed information about the pixel in the first compressed block with information about the pixel in the second compressed block. In another embodiment, global information about the image is combined with the information in the first and second compressed blocks.

25 Claims, 13 Drawing Sheets

U.S. PATENT DOCUMENTS

| | | | |
|---|---|---|---|
| 4,974,071 A | 11/1990 | Maeda | 358/539 |
| 5,045,852 A | 9/1991 | Mitchell et al. | |
| 5,046,119 A | 9/1991 | Hoffert | 382/166 |
| 5,047,853 A | 9/1991 | Hoffert et al. | |
| 5,218,431 A | 6/1993 | Gleicher et al. | |
| 5,287,200 A | 2/1994 | Sullivan et al. | |
| 5,430,464 A | 7/1995 | Lumelsky | 345/555 |
| 5,452,017 A | 9/1995 | Hickman | |
| 5,463,700 A | 10/1995 | Nakazawa | |
| 5,544,286 A | 8/1996 | Laney | 358/1.15 |
| 5,552,832 A | 9/1996 | Astle | |
| 5,576,845 A | 11/1996 | Komatsu | 382/292 |
| 5,585,944 A | 12/1996 | Rodriguez | 358/560 |
| 5,600,373 A * | 2/1997 | Chui et al. | 375/240.1 |
| 5,619,591 A | 4/1997 | Tsang et al. | 382/166 |
| 5,682,152 A * | 10/1997 | Wang et al. | 341/50 |
| 5,682,249 A | 10/1997 | Harrington et al. | 358/426.02 |
| 5,734,744 A | 3/1998 | Wittenstein et al. | 382/166 |
| 5,742,892 A | 4/1998 | Chaddha | 725/146 |
| 5,748,174 A | 5/1998 | Wong et al. | 715/798 |
| 5,748,904 A | 5/1998 | Huang et al. | 345/544 |
| 5,787,192 A | 7/1998 | Takaichi et al. | 382/166 |
| 5,805,226 A | 9/1998 | Jung | 375/240.24 |
| 5,815,159 A | 9/1998 | Katayama et al. | |
| 5,822,460 A | 10/1998 | Kim | 382/243 |
| 5,822,465 A | 10/1998 | Normile et al. | 382/253 |
| 5,847,762 A * | 12/1998 | Canfield et al. | 375/240.15 |
| 5,877,819 A | 3/1999 | Branson | |
| 5,903,673 A | 5/1999 | Wang et al. | |
| 5,929,862 A | 7/1999 | Barkans | |
| 5,956,425 A | 9/1999 | Yoshida | 382/234 |
| 5,956,431 A | 9/1999 | Iourcha et al. | 382/253 |
| 5,959,631 A | 9/1999 | Knittel | 345/420 |
| 5,978,511 A | 11/1999 | Horiuchi et al. | |
| 5,987,175 A | 11/1999 | Imaizumi et al. | 382/232 |
| 5,995,122 A | 11/1999 | Hsieh et al. | |
| 6,005,971 A | 12/1999 | Bergman et al. | |
| 6,009,200 A | 12/1999 | Fujita et al. | |
| 6,031,939 A | 2/2000 | Gilbert et al. | |
| 6,049,630 A * | 4/2000 | Wang et al. | 382/239 |
| 6,052,203 A | 4/2000 | Suzuki et al. | |
| 6,075,619 A | 6/2000 | Iizuka | 382/166 |
| 6,111,607 A | 8/2000 | Kameyama | |
| 6,125,201 A | 9/2000 | Zador | |
| 6,128,000 A | 10/2000 | Jouppi et al. | |
| 6,188,394 B1 | 2/2001 | Morein et al. | |
| 6,192,155 B1 * | 2/2001 | Fan | 382/232 |
| 6,195,024 B1 | 2/2001 | Fallon | |
| 6,285,711 B1 | 9/2001 | Ratakonda et al. | |
| 6,309,424 B1 | 10/2001 | Fallon | |
| 6,320,981 B1 * | 11/2001 | Yada | 382/168 |
| 6,349,151 B1 | 2/2002 | Jones et al. | |
| 6,438,165 B2 | 8/2002 | Normile | |
| 6,529,631 B1 | 3/2003 | Peterson et al. | |
| 6,606,417 B1 | 8/2003 | Brechner | |
| 6,614,449 B1 | 9/2003 | Morein | |
| 6,658,146 B1 | 12/2003 | Iourcha et al. | 382/166 |
| 6,683,978 B1 | 1/2004 | Iourcha et al. | 382/132 |
| 6,683,979 B1 | 1/2004 | Walker et al. | |
| 6,687,410 B1 | 2/2004 | Brown | |
| 6,731,810 B1 | 5/2004 | Miura et al. | |
| 6,825,847 B1 | 11/2004 | Molnar et al. | |
| 6,944,332 B1 | 9/2005 | Brechner | |
| 6,990,249 B2 | 1/2006 | Nomura | |
| 7,050,641 B1 * | 5/2006 | Kharitonenko | 382/240 |
| 7,103,357 B2 | 9/2006 | Kirani et al. | |
| 7,158,271 B2 | 1/2007 | Sawada | |
| 7,177,371 B1 | 2/2007 | Hudson et al. | |
| 7,224,846 B2 * | 5/2007 | Fujishiro et al. | 382/240 |
| 7,352,300 B2 | 4/2008 | Fallon | |
| 7,355,603 B2 | 4/2008 | Donovan et al. | |
| 7,505,624 B2 | 3/2009 | Ogden et al. | |
| 2004/0081357 A1 | 4/2004 | Oldcorn et al. | |
| 2004/0161146 A1 | 8/2004 | Van Hook et al. | |
| 2004/0174379 A1 | 9/2004 | Collodi | |
| 2006/0188163 A1 | 8/2006 | Elder | |
| 2006/0215914 A1 | 9/2006 | Aleksic et al. | |

FOREIGN PATENT DOCUMENTS

| | | |
|---|---|---|
| WO | WO 97/08900 | 3/1997 |
| WO | WO 99/18537 | 4/1999 |

OTHER PUBLICATIONS

Andreas Schilling, Wolfgang Strasser, Gunter Knittel; Texram: A Smart Memory for Texturing; May 1996; IEEE Computer Graphics and Applications.

Graham Campbell; Two Bit/Pixel Full Color Encoding; 1984; vol. 20, No. 4; Dallas.

Ching-Yung Yang, Ja-Chen Lin; Hybrid Adaptive Block Truncation Coding for Image Compression; Apr. 1997; Society of Photo-Optical Instrumentation Engineers; Taiwan.

Anders Kugler; High-Performance Texture Decompression Hardware; 1997; The Visual Computer.

Panos Nasiopoulos, Rabab K. Ward and Daryl J. Morse; Adaptive Compression Coding; Aug. 1991; IEEE Transactions on Communications, New York, U.S.

G. Knittel, A Schilling, A. Kugler and W. Strasser; Hardware for Superior Texture Performance.

Edward J. Delp and Robert O. Mitchell; Image Compression Using Block Truncation Coding; 1979; IEEE.

C. Y. Yang and J. C. Lin; Use of Radius Weighted Mean to Cluster Two-Class Data; May 1994; vol. 30, No. 10; Electronics Letters.

John C. Russ; Optimal Grey Scale Images from Multiplane Color Images; 1995; vol. 7, No. 4; Journal of Computer-Assisted Microscopy.

Yushu Feng and Nasser M. Nasrabadi; A Dynamic Address Vector Quantization Algorithm Based on Inter-Block and Inter-Color Correlation for Color Image Coding; 1989; IEEE.

K. T. Lo and W. K. Cham; New Predictive Classified Vector Quantization Scheme for Image Compression; Aug. 1994; vol. 30, No. 16; Electronics Letters.

Kowk-Tung Lo and Wal-Kuen Cham; New Classified Vector Quantization of Images; 1993; IEEE, Beijing.

Edward J. Delp and Owen Robert Mitchell; Moment Preserving Quantization; 1991; IEEE.

Bing Zeng and Yrjo Neuvo; Interpolative BTC Image Coding with Vector Quantization; 1993; IEEE.

Maximo D. Lema and O. Robert Mitchell; Absolute Moment Block Truncation and Its Application to Color Images; 1984; IEEE.

Yiyan Wu and David C. Coll; Single Bit-Map Block Truncation Coding of Color Images; 1992; IEEE.

Mohammed Kamel, C. T. Sun and Lian Guan; Image Compression by Variable Block Truncation Coding with Optimal Threshold; 1991; IEEE.

B. Zeng; Two Interpolative BTC Image Coding Schemes; Jun. 1991; Electronics Letters.

Y. A. Alsaka and D. A. Lee; Three Level Block Truncation Coding; 1990; IEEE.

E. Walach; A Modified Block Truncation Coding Technique for Image Compression; 1983; IEEE.

Bernd Lamparter and Wolfgang Effelsberg; eXtended Color Cell Compression—A Runtime-efficient Compression Scheme for Software Video.

Takio Kurita and Nobuyuki Otsu; A Method of Block Truncation Coding for Color Image Compression; 1993; IEEE.

Soo-Chang Pei and Ching-Min Cheng; A Novel Block Truncation Coding of Color Images Using a Quaternion-Moment-Preserving Principle; 1997, IEEE.

Tak Po Chan; Bing Zeng and Ming L. Liou; Visual Pattern BTC with Two Principle Colors for Color Images; 1995; IEEE.

Quoping Qiu; Color Image Coding and Indexing Using BTC; 1994; IEEE.

K. W. Chan and K. L. Chan; Optimized Adaptive AMBTC; 1994; IEEE.

Eric Dubois; Effects of Digital Demodulation on Component Coding of NTSC Color Signals; 1979; IEEE.

European Patent Office, International Search Report issued Jul. 14, 2006 for Application No. PCT/IB2006/000700.

Hui, L.; An adaptive block truncation coding algorithm for image compression; ICASSP 90; 1990 International Conference on Acoustics, Speech and Signal Processing; Apr. 3, 1990; pp. 2233-2236.

Goeddel, T.W. et al.; A Two-Dimensional Quantizer for Coding of Digital Imagery; IEEE Transactions on Communications USA; vol. COM-29, No. 1; Jan. 1981; pp. 60-67.

Franti, P. et al.; Compression of Digital Images by Block Truncation Coding: A Survey; Computer Journal; Oxford University Press, Surrey, GB; vol. 37, No. 4; Jan. 1994.

Deering, et al.; Leo: A System for Cost Effective 3D Shaded Graphics; Proceedings of the 20th Annual Conference on Computer Graphics and Interactive Techniques; 1993; pp. 101-108.

Akeley; RealityEngine Graphics; Proceedings of the 20th Annual Conference on Computer Graphics and Interactive Techniques; 1993; pp. 109-116.

* cited by examiner

METHOD AND APPARATUS FOR BLOCK BASED IMAGE COMPRESSION WITH MULTIPLE NON-UNIFORM BLOCK ENCODINGS

CROSS-REFERENCE TO RELATED APPLICATIONS

The present application claims the benefit of priority from pending U.S. Provisional Patent Application No. 60/447,862, entitled Method and Apparatus For Block Based Image Compression With Multiple Non-Uniform Block Encodings, filed on Feb. 13, 2003, which is herein incorporated by reference in its entirety.

BACKGROUND OF THE INVENTION

1. Field of the Invention

The present invention relates to the field of image compression, and in particular to a method and apparatus for block based image compression with multiple non-uniform block encodings.

2. Background Art

Typically, there is a desire to compress images used for texturing operations in 3D graphics accelerator hardware to improve the performance of rendering and reduce the memory required to store the information. However, prior art image compression methods frequently produce undesired visual artifacts when rendering images, making their application appropriate for a limited number of images. This problem can be better understood with a review of image compression.

Image Compression

Prior art compression techniques can be categorized in at least two ways. First, a technique can be either loss-less or lossy. Second, a technique can be either fixed or variable rate. A loss-less compression technique is one in which no information about the image is lost due to the compression. Thus, an image could be compressed and decompressed and the decompressed image would be identical to the original image. A lossy compression technique is one in which some information about the image is lost due to the compression. Thus, compression of an image followed by decompression could result in a decompressed image that is not identical to the original image.

A fixed rate compression technique reduces the storage requirement of an image by a fixed percentage. Since most image formats do not contain unnecessary data, almost all fixed rate compression techniques are lossy in general (however, they may not be lossy for a particular image). A variable rate compression technique reduces the storage requirement of an image by an amount that is not known at the time when the image is compressed. In fact, the storage requirement may not be reduced at all.

Because loss-less, variable rate compression techniques are unable to guarantee any rate of compression, graphics systems typically use lossy, fixed rate compression techniques. However, the lossy nature sometimes results in unacceptable image quality (i.e., visual artifacts). Sometimes, it is so difficult to determine when compression will result in unacceptable loss of image quality and when it will not that users and/or systems elect to forgo compression altogether. As systems are developed that utilize larger amounts of information about the system, the desire for compression increases, but the problem of unacceptable image quality loss also increases in prior art compression systems.

SUMMARY OF THE INVENTION

Embodiments of the present invention are directed to a method and apparatus for block based image compression with multiple non-uniform block encodings. In one embodiment of the present invention, an image is divided into blocks of pixels. In one embodiment the blocks are four pixels by four pixels, but other block sizes are used in other embodiments.

In one embodiment, a block of pixels in the original image is decomposed into one or more decomposed blocks, each of which represent a partial data value of the original block. Each of these blocks are compressed using the same or different methods for each block to produce one or more compressed blocks, which are combined to produce an output block. Thus, each block in the original image is represented by a plurality, typically different, compressed blocks each representing all the data values of the block. In one embodiment, color (or a similar value) associated with a pixel is determined by combining the compressed information about the pixel in one compressed block with compressed information about the same pixel in another compressed block. In another embodiment, global information about the image is also combined with the information in one or more compressed blocks to produce a desired value for a pixel.

According to one embodiment, decomposition of the original image is optimized to reduce the loss. According to one embodiment, the optimization is performed by conducting a series of functions on a first subset comprising of one or more decomposed blocks and applying the results to a second subset comprising of one or more decomposed blocks different from the ones in the first subset. According to one embodiment, these functions are iterated through the subsets until a predetermined value of the image is obtained, or some other factor is satisfied. According to another embodiment, the optimization is performed by projecting an original block to a predefined vector and storing the original block's magnitude in a first block, and using a device that projects and subtracts the projection block from of the original block and stores the value in a second block. According to another embodiment, the optimization is performed by conducting a series of functions on the first and second blocks obtained in the previous embodiment. According to another embodiment, the optimization of the previous embodiment is iterated in a loop until a desired output image is accomplished or some other factor is met.

As way of example, two decomposed blocks of an original box of pixels in the image are compressed using two different methods to produce a first and a second compressed block by encoding each pixel value as an index into a color map before combining the two compressed blocks to generate an output block. In one embodiment, the color map maps pixels to a best fit curve with two end points in a color space. In one embodiment the curve is a straight line. In one embodiment, the end points of the best fit curve are values to which the mapping can map. In another embodiment, the mapping can map to an extrapolated value between two endpoints along the best fit curve. In still another embodiment, the mapping can map to a plurality of different extrapolated values between two endpoints along the best fit curve. In one embodiment, the compressed block is comprised of the two endpoints of the best fit curve and index values for each of the pixels.

In an example embodiment, the original block is a four pixel by four pixel block wherein each pixel value is represented by 24 bits (e.g., a 24-bit RGB color value). Two, 16-bit endpoints for a best fit curve are stored. Additionally, sixteen 2-bit indices (one for each pixel in the block) are stored. The indices encode which of the two endpoint colors or two interpolated values along the curve are the compressed color for each pixel. The endpoints and the indices comprise a first compressed block.

In another example embodiment, a compressed block is created by applying a function to each of the values of the original block to obtain new block values. In one embodiment, the function combines components of each value to reduce the amount of space needed to encode the data. In an example embodiment, 24-bit RGB values are combined to create an 8-bit grey scale value (e.g., (R+G+B)/3). In one embodiment, the new block values are compressed by encoding the block as an index for mapping onto a best fit curve. In one embodiment, two endpoints are stored. In another embodiment, the indices map to either the two end points or any of one or more interpolated values along the best fit curve. The two stored endpoints and the block of indices comprise a second compressed block.

In an example embodiment, the original block is a four pixel by four pixel block wherein each pixel value is represented by 24 bits (e.g., a 24-bit RGB color value). The values in the block are converted to 8-bit grey scale values. Two, 8-bit endpoints for a best fit curve are stored. Additionally, sixteen 3-bit indices (one for each pixel in the block) are stored. The indices encode which of the two endpoint colors or six interpolated values along the curve are the compressed color for each pixel. The endpoints and the indices comprise a third compressed block. Further compressed blocks can be similarly obtained.

In one embodiment, the error generated by compression is computed and if the error is greater than a threshold value, one or more values in the plurality of compressed blocks are altered to reduce the computed error. In one embodiment, the color values are encoded as YCrCb. In one embodiment, the Y component is encoded in one compressed block and CrCb endpoints are used to encode another compressed block. In another embodiment, the color values are encoded as RGB values. One of the RGB components are encoded in one compressed block and endpoints in the other two components' color spaces are used to encode another compressed block.

In one embodiment, the function associated with the creation of one or more compressed blocks is not a grey scale function. Instead, a vector that represents the axis of the function is stored in the compressed blocks. In one embodiment, the vector is of unit length. In another embodiment, the vector is of non-unit length. In one embodiment, the vector is a 16-bit axis vector stored in addition to the endpoints and indices as part of the one or more compressed blocks. In another embodiment, two 8-bit Theta-Phi axis components are stored in addition to the endpoints and indices as part of the one or more compressed blocks. The Theta-Phi axis components represent angle and elevation of the axis vector on a hemisphere. In one embodiment, the number of bits per index is reduced to allow storage of the vector value without increasing the size of a compressed block beyond a desired maximum size. In various other embodiments, more than one compressed blocks are encoded to represent each original block. Specific bit values have been for the purpose of example. One of ordinary skill in the art will recognize that embodiments of the present invention may be practiced with original pixel values of any size, using any color encoding scheme, and generating one or more compressed blocks.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for block based image compression with multiple non-uniform block encodings. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Multiple Blocks

Embodiments of the present invention are directed to a method and apparatus for block based image compression with multiple non-uniform block encodings. In one embodiment of the present invention, an image is divided into blocks of pixels. In one embodiment the blocks are four pixels by four pixels, but other block sizes are used in other embodiments.

In one embodiment, a block of pixels in the original image is decomposed into one or more decomposed blocks, each of which represent a partial data value of the original block. According to one embodiment, the decomposition is based on applying a predefined transform function to each block of pixels. According to another embodiment, the decomposition is optimized to reduce the loss of image quality. Each of these decomposed blocks are then compressed using the same or different methods for each block to produce one or more compressed blocks, which are combined to produce an output block. Thus, each block in the original image is represented by a plurality, typically different, compressed blocks each representing all the data values of the block. In one embodiment, color (or a similar value) associated with a pixel is determined by combining the compressed information about the pixel in one compressed block with compressed information about the same pixel in another compressed block. In another embodiment, global information about the image is also combined with the information in one or more compressed blocks to produce a desired value for a pixel.

Figure 1:
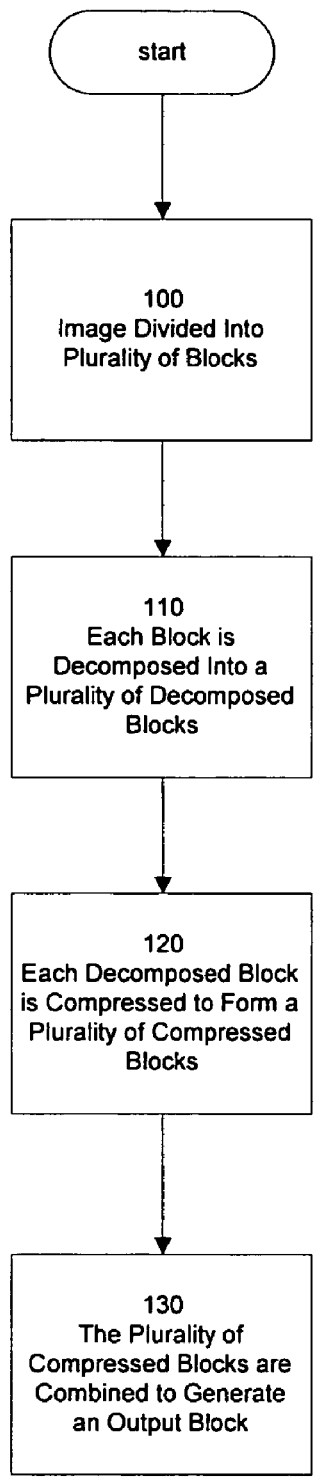
FIG. 1 is a flow diagram of the process of compressing an image in accordance with one embodiment of the present invention.

FIG. 1 illustrates the process of compressing an image in accordance with one embodiment of the present invention. At block 100, an image is divided into a plurality of blocks. At block 110, each block is decomposed into a plurality of decomposed blocks. At step 120, each of these decomposed blocks is compressed to form a plurality of compressed blocks. At step 130, the plurality of compressed blocks are combined to generate an output block.

Optimization of Decomposed Image Block

According to one embodiment, the decomposition of each original block of the image is optimized so that the loss in image quality is reduced to a desired amount, or meets some threshold. According to another embodiment of the present invention, there are several levels of optimization available depending on the threshold or other factors such as time constraints, quality of output image, etc. It should be noted here, that the optimization methods mentioned below take into account only a limited amount of blocks (2 in these cases), but an unlimited amount of blocks can be used without departing from the scope of the present invention.

Figure 9:
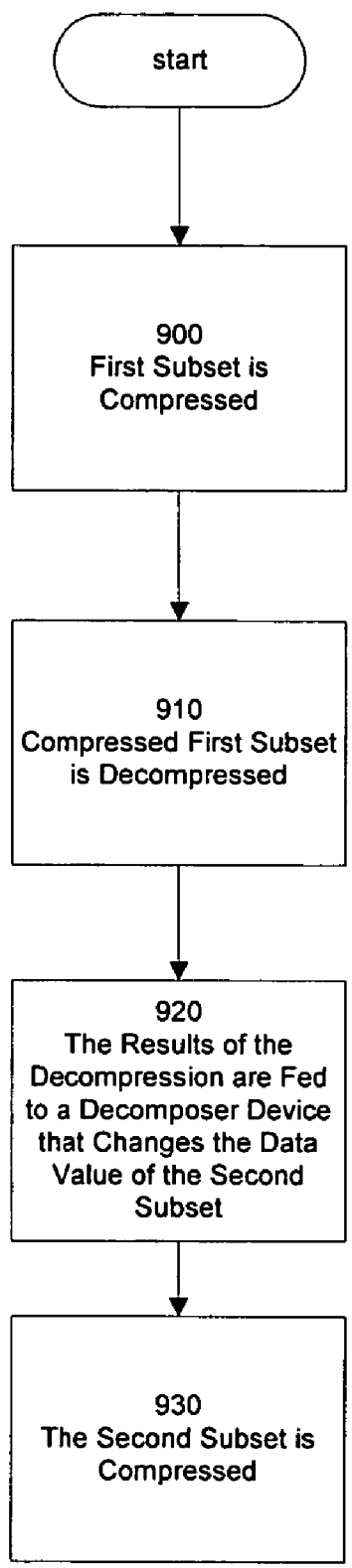
FIG. 9 is an optimization method according to one embodiment of the present invention.

A first optimization method for decomposition uses a first subset comprising of one or more decomposed blocks and a second subset comprising of one or more decomposed blocks different from the ones in the first subset. This optimization method is illustrated in FIG. 9. At block 900, the first subset is compressed. Compression schemes are explained in more detail below. Next, at block 910, the compressed first subset is decompressed. Next, at block 920, the results of the decompression are fed to a decomposer device that changes the data value of the second subset. Next, at bock 930, the second subset is compressed. Blocks 900 through 930 are repeated for every subset of an image until the entire image is compressed.

Figure 10:
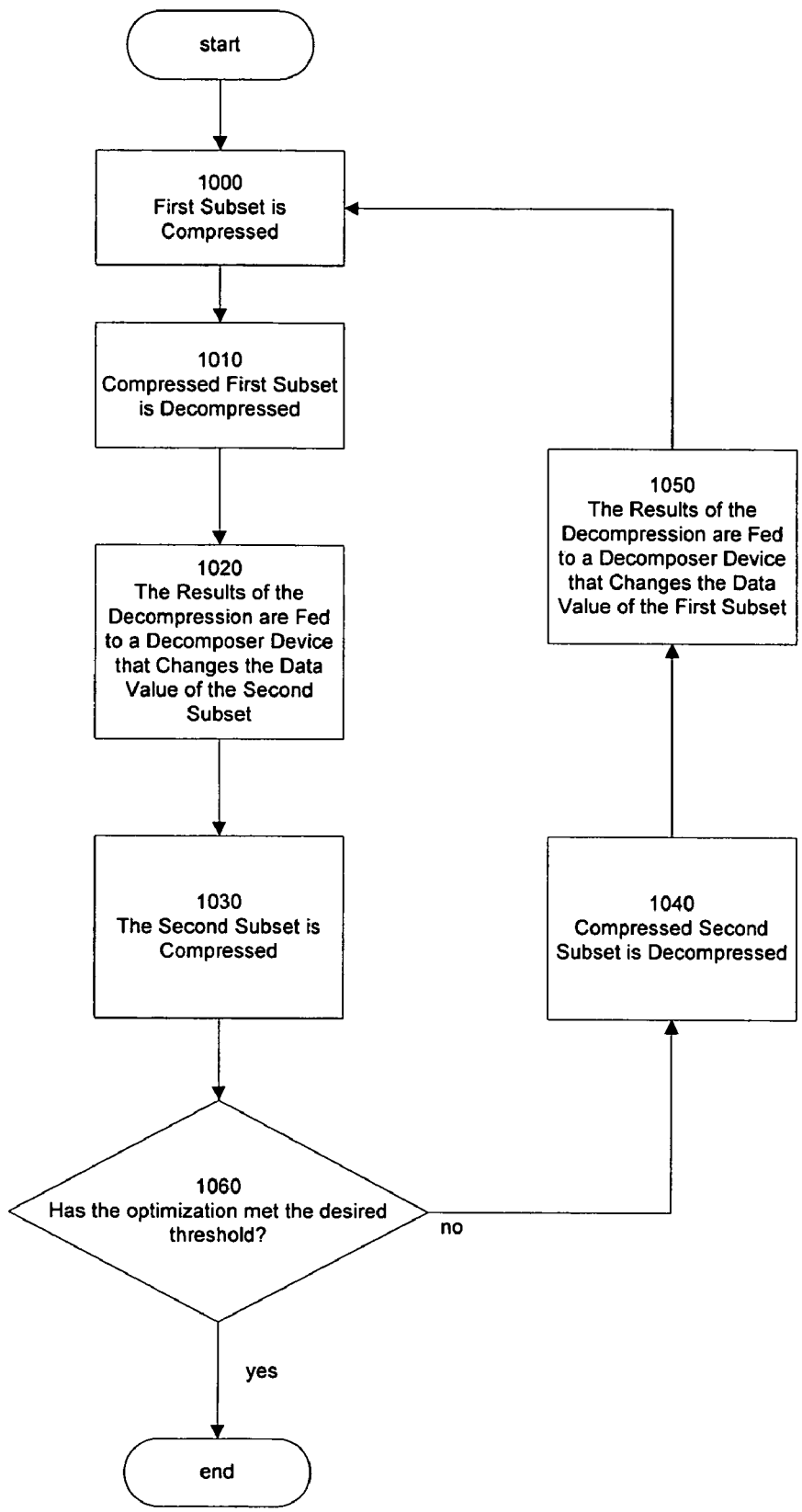
FIG. 10 is another optimization method according to one embodiment of the present invention.

A second optimization method uses the first optimization method in addition to a final iteration step. This optimization method is illustrated in FIG. 10. Blocks 900 through 930 remain the same and are numbered 1000 through 1030. Next, at block 1060, if the optimization has met a certain threshold or some other factor, then we stop, else at block 1040 the compressed second subset is decompressed. Next, at block 1050, the results of the decompression are fed to a decomposer device that changes the data value of the first subset, and blocks 1000, 1010, 1020, 1030, and 1060 are repeated again.

Figure 11:
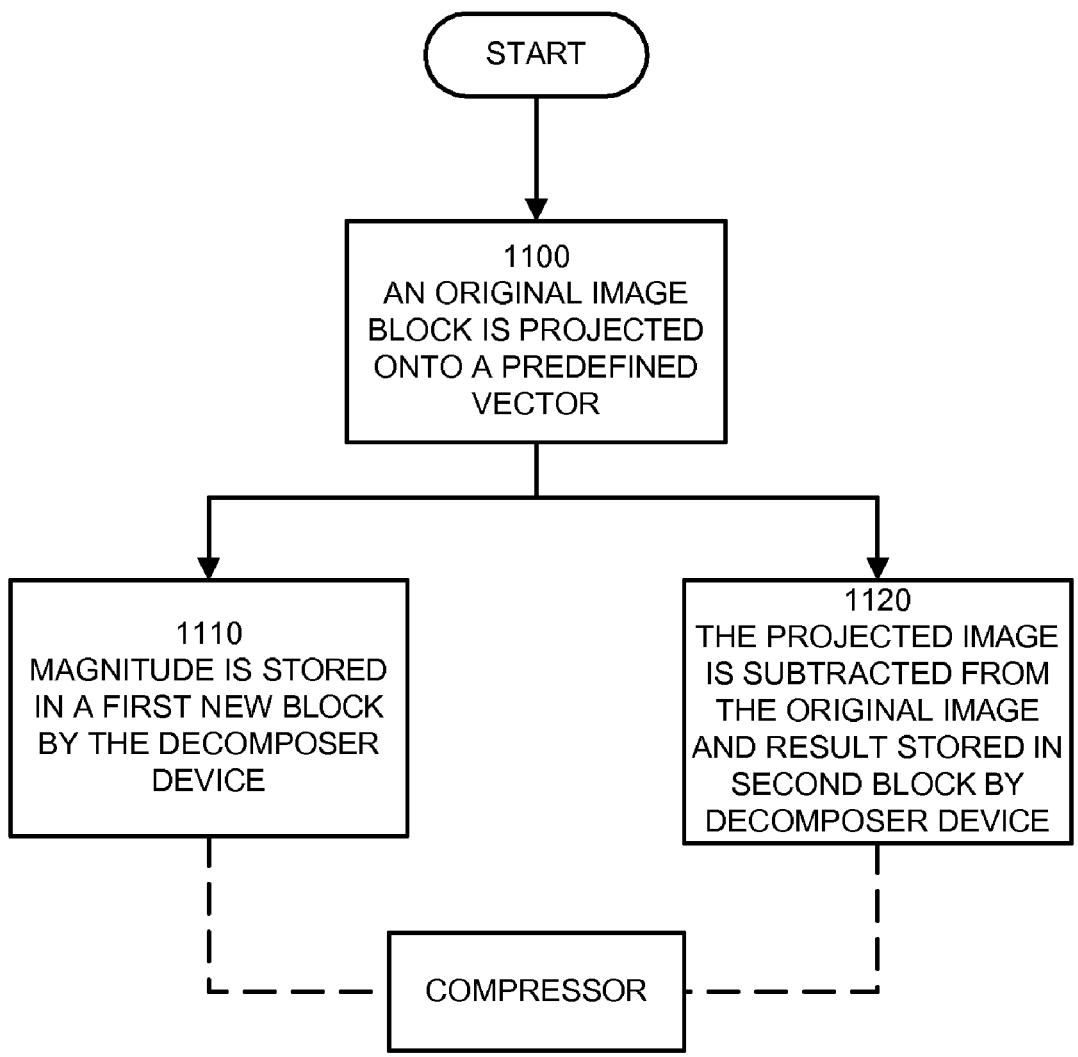
FIG. 11 is another optimization method according to one embodiment of the present invention.

A third optimization method uses an original image block in conjunction with a series of functions to generate two new blocks. This optimization method is illustrated in FIG. 11. At block 1100, an original image block is projected onto a pre-defined vector, and at block 1110 its magnitude is stored in a first new block by a decomposer device. Concurrently, at block 1120, the projected image is subtracted from the original image and the result is stored in a second new block.

Figure 12:
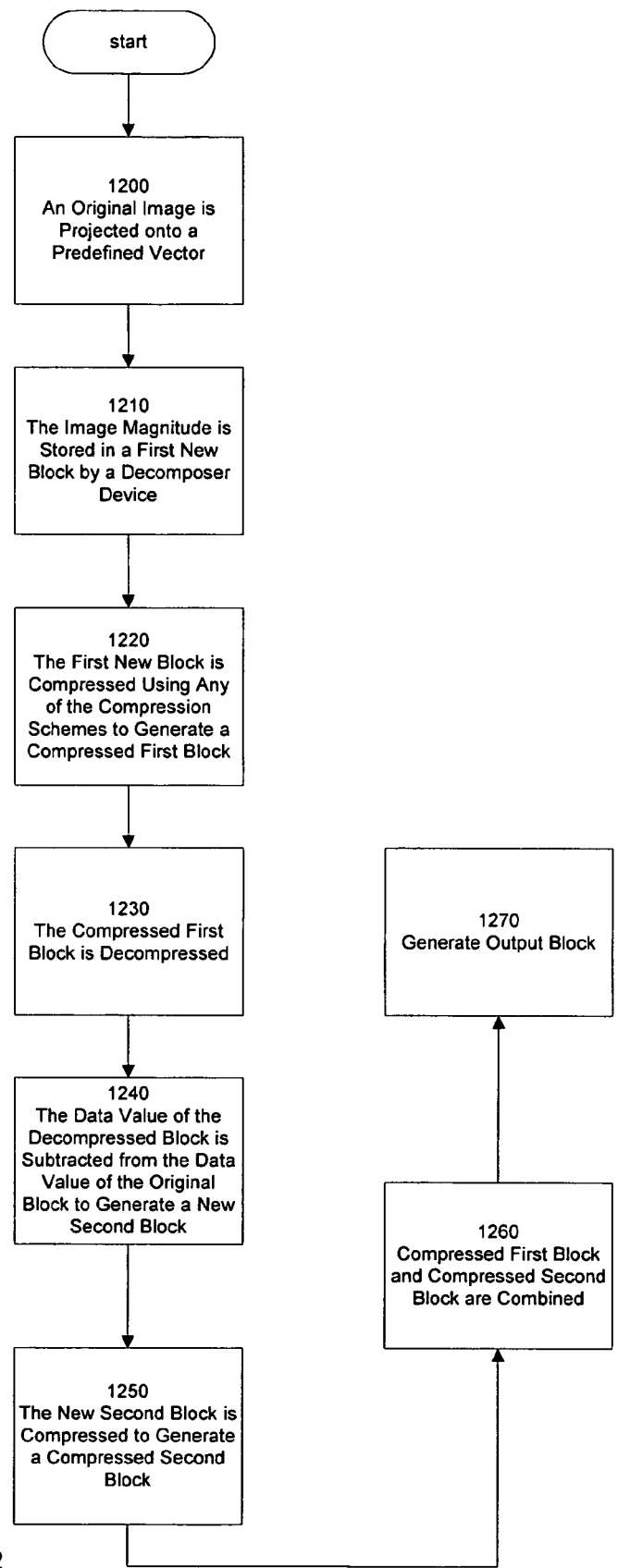
FIG. 12 is another optimization method according to one embodiment of the present invention.

A fourth optimization method uses an original image block in conjunction with a series of functions to generate two new blocks. This optimization method is illustrated in FIG. 12. At block 1200, an original image block is projected onto a pre-defined vector, and at 1210 its magnitude is stored in a first new block by a decomposer device. Next, at block 1220, the first new block is compressed using any of the compression schemes described below to generate a compressed first block. Next, at block 1230, the compressed first block is decompressed. Next, at block 1240, the data value of the decompressed first block is subtracted from the data value of the original block to generate a new second block. Next, at block 1250, new second block is compressed to generate a compressed second block. Next, at block 1260, compressed first block and compressed second block are combined to generate an output block at block 1270.

Figure 13:
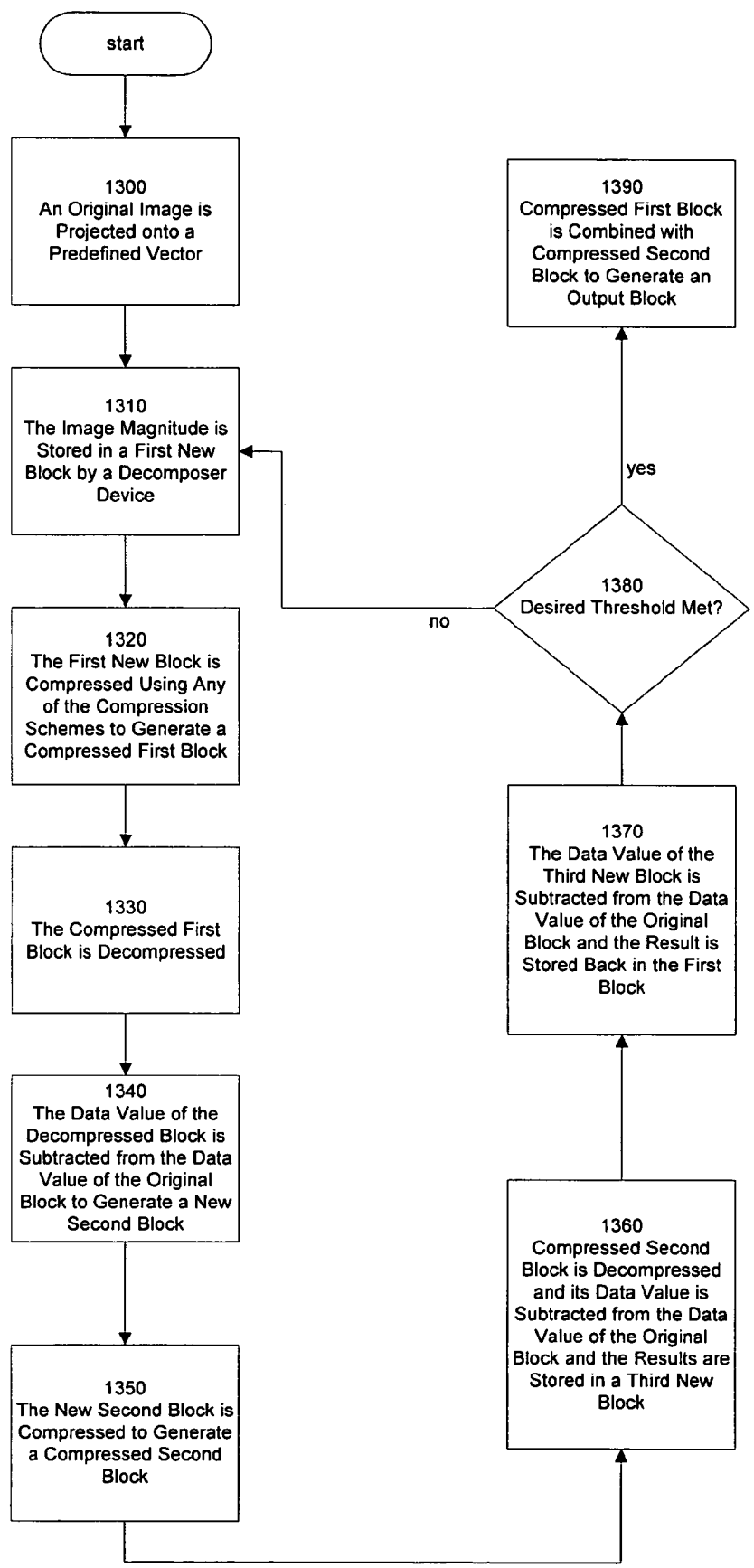
FIG. 13 is another optimization method according to one embodiment of the present invention.

A fifth optimization method uses an original image block in conjunction with a series of functions to generate two new blocks. This optimization method is illustrated in FIG. 13. At block 1300, an original image block is projected onto a pre-defined vector, and at 1310 its magnitude is stored in a first new block by a decomposer device. Next, at block 1320, the first new block is compressed using any of the compression schemes described below to generate a compressed first block. Next, at block 1330, the compressed first block is decompressed. Next, at block 1340, the data value of the decompressed block is subtracted from the data value of the original block to generate a new second block. Next, at block 1350, new second block is compressed to generate a compressed second block. Next, at block 1360, compressed second block is decompressed and its data value subtracted from the data value of the original block and the results are stored in a third new block. Next, at block 1370, the data value of the third new block is subtracted from the data value of the original block and the result is stored back in the first new block. At block 1380, if the desired threshold is met, then the compressed first block is combined with the compressed second block to generate an output block at block 1390, else blocks 1310-1370 are repeated again.

One Compression Method

Figure 2:
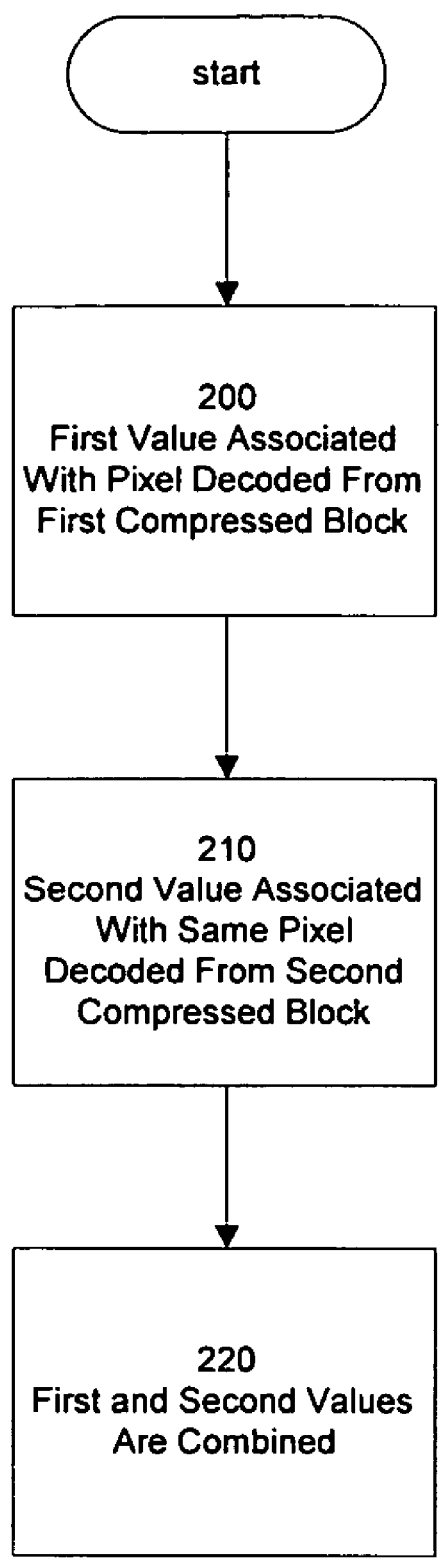
FIG. 2 is a flow diagram of the process of determining a color for a pixel in accordance with one embodiment of the present invention.

FIG. 2 illustrates the process of determining a color for a pixel in accordance with one embodiment of the present invention. At block 200, a first value associated with a pixel is decoded from a first compressed block. At block 210, a second value associated with the same pixel is decoded from a second compressed block. At block 220, the first and second values are combined to generate an output pixel. In one embodiment, the values are combined by averaging. In another embodiment, the values are combined by appending one to the end of another. In other embodiments, other combining functions are used. It should be noted here that there can be more than two compressed blocks each containing a different value associated with the same pixel, but the general idea of combining the values of each compressed block to generate an output pixel remains the same as explained above.

Another Compression Method

In one embodiment, a first compressed block is created by encoding each pixel value as an index into a color map. In one embodiment, the color map maps pixels to a best fit curve with two end points in a color space. In one embodiment the curve is a straight line. In one embodiment, the end points of the best fit curve are values to which the mapping can map. In another embodiment, the mapping can map to an extrapolated value between two endpoints along the best fit curve. In still another embodiment, the mapping can map to a plurality of different extrapolated values between two endpoints along the best fit curve. In one embodiment, the compressed block is comprised of two points of the best fit curve and index values for each of the pixels. In another embodiment, the two points are the two endpoints.

Figure 3:
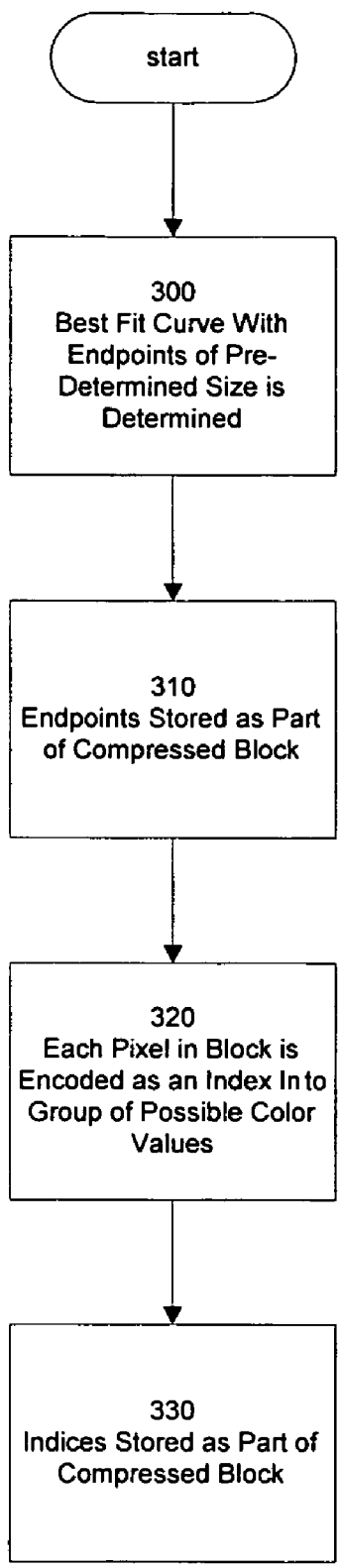
FIG. 3 is a flow diagram of the process of compressing a pixel block in accordance with one embodiment of the present invention.

FIG. 3 illustrates the process of compressing a decompressed block in accordance with one embodiment of the present invention. At block 300, a best fit curve with endpoints of a pre-determined size is determined. At block 310, the endpoints are stored as part of a compressed block. At block 320, each pixel in the decompressed block is encoded as an index into a group of possible color values. In one embodiment, the possible color values are comprised of the stored endpoints. In another embodiment, the possible color values are comprised of the stored endpoints and one or more interpolated values on the best fit curve. At block 330, the indices are stored as part of the compressed block.

In an example embodiment, the original block is a four pixel by four pixel block wherein each pixel value is represented by 24 bits (e.g., a 24-bit RGB color value). Two, 16-bit endpoints for a best fit curve are stored. Additionally, sixteen 2-bit indices (one for each pixel in the block) are stored. The indices encode which of the two endpoint colors or two interpolated values along the curve are the compressed color for each pixel. The endpoints and the indices comprise a first compressed block.

Figure 4:
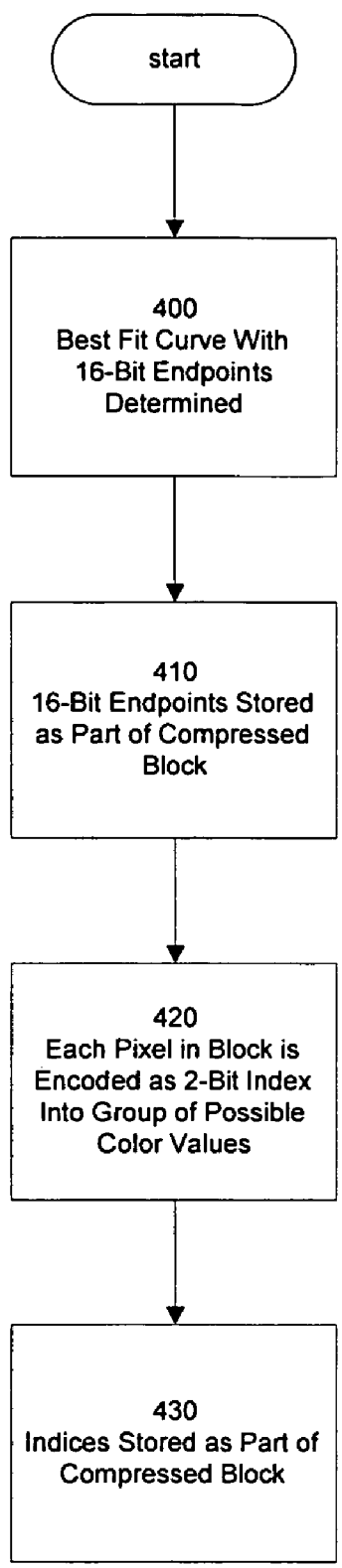
FIG. 4 is a flow diagram of the process of compressing a 24-bit per pixel, four pixel by four pixel block in accordance with one embodiment of the present invention.

FIG. 4 illustrates the process of compressing a 24-bit per pixel, four pixel by four pixel block in accordance with one embodiment of the present invention. At block 400, a best fit curve with 16-bit endpoints is determined. At block 410, the 16-bit endpoints are stored as part of a compressed block. At block 420, each pixel in the block is encoded as a 2-bit index into a group of possible color values. The possible color values are the two 16-bit endpoints and two interpolated values on the curve. At block 430, the indices are stored as part of the compressed block. The original block required 384 bits of storage space. The compressed block requires only 64 bits of storage space.

Yet Another Compression Method

In another embodiment, a compressed block is created by applying a function to each of the values of the block to obtain new block values. In one embodiment, the function combines components of each value to reduce the amount of space needed to encode the data. In an example embodiment, 24-bit RGB values are combined to create an 8-bit grey scale value (e.g., (R+G+B)/3). In one embodiment, the new block values are compressed by encoding the block as an index for mapping onto a best fit curve. In one embodiment, two endpoints are stored. In another embodiment, the indices map to either the two points or any of one or more interpolated values along the best fit curve. In one embodiment, the two points are end points. The two stored endpoints and the block of indices comprise a second compressed block.

Figure 5:
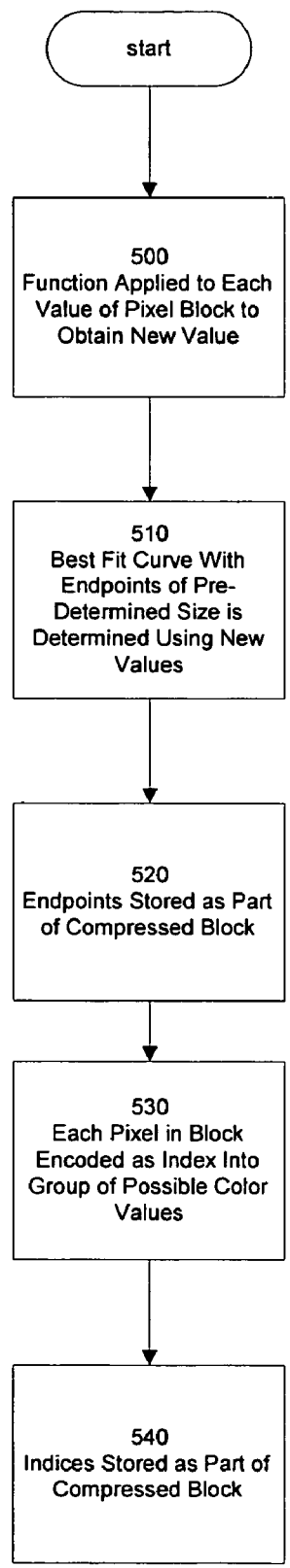
FIG. 5 is a flow diagram of the process of compressing a pixel block in accordance with one embodiment of the present invention.

FIG. 5 illustrates the process of compressing a decompressed block in accordance with one embodiment of the present invention. At block 500, a function is applied to each value of the pixel block to obtain a new value. At block 510, a best fit curve with endpoints of a pre-determined size is determined using the new values. At block 520, the endpoints are stored as part of a compressed block. At block 530, each pixel in the block is encoded as an index into a group of possible color values. In one embodiment, the possible color values are comprised of the stored endpoints. In another embodiment, the possible color values are comprised of the stored endpoints and one or more interpolated values on the best fit curve. At block 540, the indices are stored as part of the compressed block.

In an example embodiment, the original block is a four pixel by four pixel block wherein each pixel value is represented by 24 bits (e.g., a 24-bit RGB color value). The values in the block are converted to 8-bit grey scale values. Two, 8-bit endpoints for a best fit curve are stored. Additionally, sixteen 3-bit indices (one for each pixel in the block) are stored. The indices encode which of the two endpoint colors or six interpolated values along the curve are the compressed color for each pixel. The endpoints and the indices comprise a third compressed block. Further compressed blocks can be similarly obtained.

Figure 6:
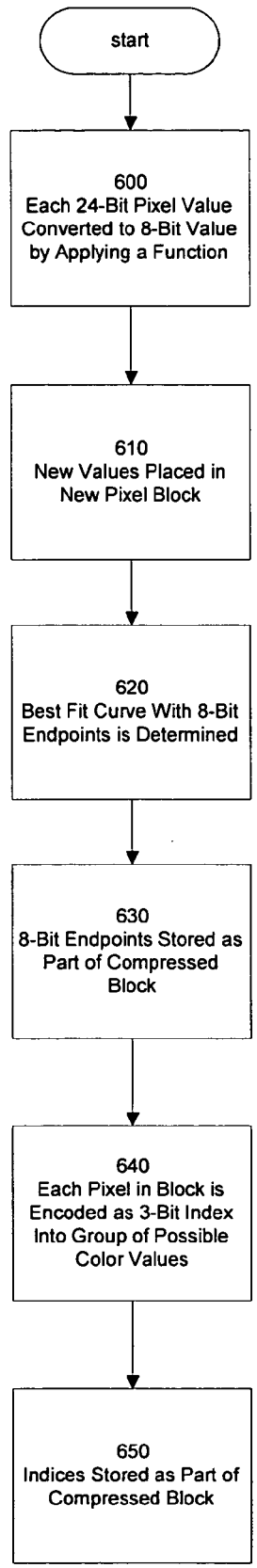
FIG. 6 is a flow diagram of the process of compressing a 24-bit per pixel, four pixel by four pixel block in accordance with one embodiment of the present invention.

FIG. 6 illustrates the process of compressing a 24-bit per pixel, four pixel by four pixel block in accordance with one embodiment of the present invention. At block 600, each 24-bit pixel value is converted to an 8-bit value by applying a function. In one embodiment, the 24-bit pixel value is an RGB value and the function applied is the average of the RGB values. At block 610, the new values are placed in a new pixel block. At block 620, a best fit curve with 8-bit endpoints is determined. At block 630, the 8-bit endpoints are stored as part of a compressed block. At block 640, each pixel in the block is encoded as a 3-bit index into a group of possible color values. The possible color values are the two 8-bit endpoints and six interpolated values on the curve. At block 650, the indices are stored as part of the compressed block. The original block required 384 bits of storage space. The compressed block requires only 64 bits of storage space.

Error Reduction

Figure 7:
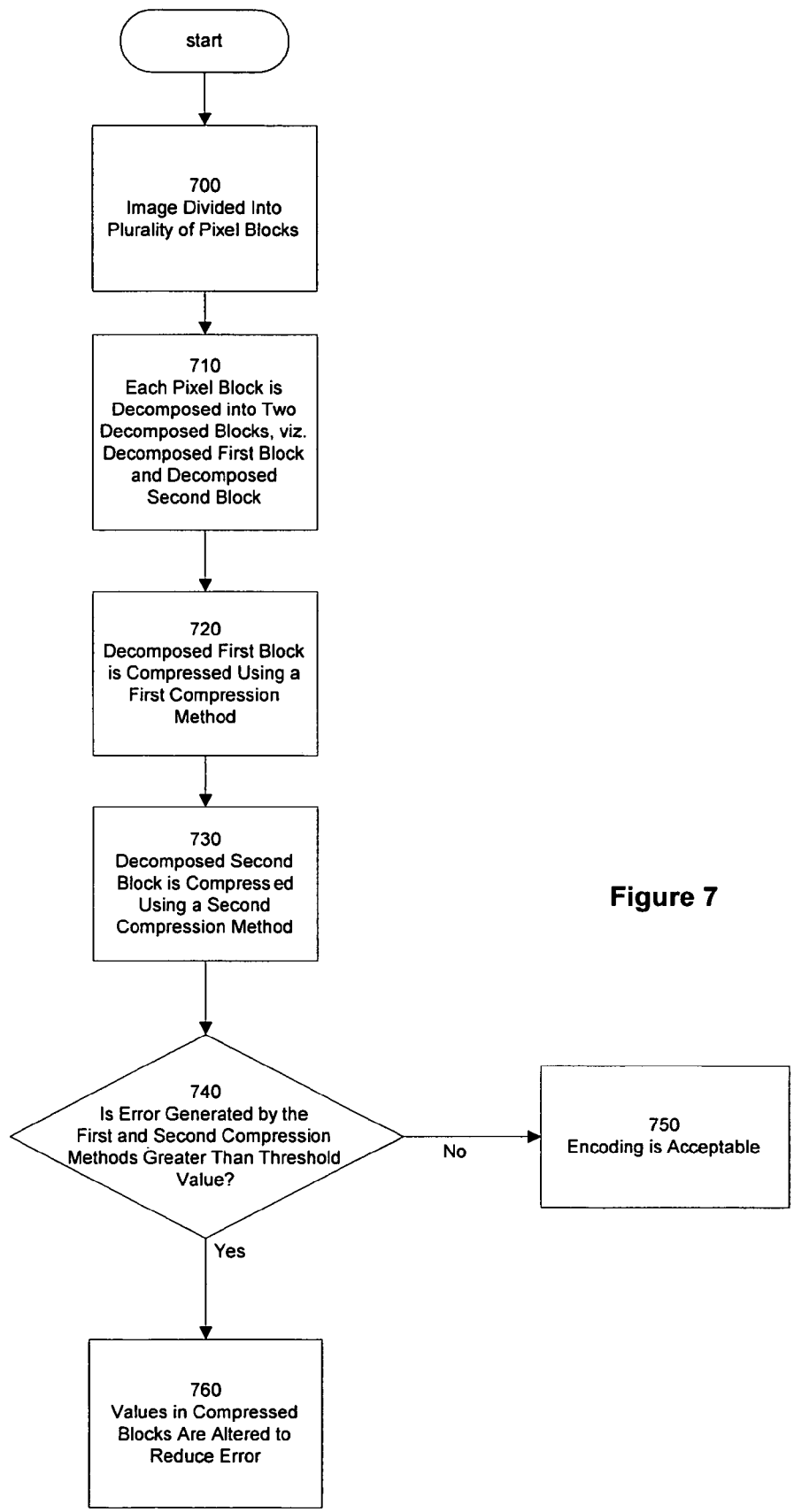
FIG. 7 is a flow diagram of the process of reducing the occurrence of visual artifacts in accordance with one embodiment of the present invention.

In one embodiment, the error generated by compression is computed. If the error is greater than a threshold value, one or more values of one or more compressed blocks are altered to reduce the computed error. Thus, the problem of visual artifacts is reduced. FIG. 7 illustrates the process of reducing the occurrence of visual artifacts in accordance with one embodiment of the present invention. At block 700, an image is divided into a plurality of pixel blocks. At block 710, each pixel block is decomposed into two decomposed blocks, viz. decomposed first block and decomposed second block. At step 720, decomposed first block is compressed using a first compression method. At block 730, decomposed second block is compressed using a second compression method. At block 740, it is determined whether the error generated by the first and second compression methods is greater than a threshold value. If the error generated is not greater than the threshold value, at block 750, the encoding is acceptable. If the error generated is greater than the threshold value, at block 760, the values in the compressed blocks are altered to reduce the error. It should be noted here that FIG. 7 is by way of an example that uses only two compressions of an original pixel block, but any number of compressions are possible depending on the quality of compression desired, memory constraints of the computer, or other factors without departing from the scope of the present invention.

Alternative Color Encodings

In one embodiment, the color values are encoded as YCrCb. In one embodiment, the Y component is encoded in one compressed block and CrCb endpoints are used to encode another compressed block. In another embodiment, the color values are encoded as RGB values. One of the RGB components are encoded in one compressed block and endpoints in the other two components' color spaces are used to encode another compressed block.

In one embodiment, the function associated with creation of one or more compressed block is not a grey scale function. Instead, a vector that represents the axis of the function is stored in the compressed block. In one embodiment, the vector is of unit length. In another embodiment, the vector is of non-unit length. In one embodiment, the vector is a 16-bit axis vector stored in addition to the endpoints and indices as part of the compressed block. In another embodiment, two 8-bit Theta-Phi axis components are stored in addition to the endpoints and indices as part of the one or more compressed blocks. The Theta-Phi axis components represent angle and elevation of the axis vector on a hemisphere. In one embodiment, the number of bits per index is reduced to allow storage of the vector value without increasing the size of a compressed block beyond a desired maximum size. In various other embodiments, more than one compressed blocks are encoded to represent each original block. Specific bit values have been for the purpose of example. One of ordinary skill in the art will recognize that embodiments of the present invention may be practiced with original pixel values of any size, using any color encoding scheme, and generating one or more compressed blocks.

Embodiment of Computer Execution Environment (Hardware)

Figure 8:
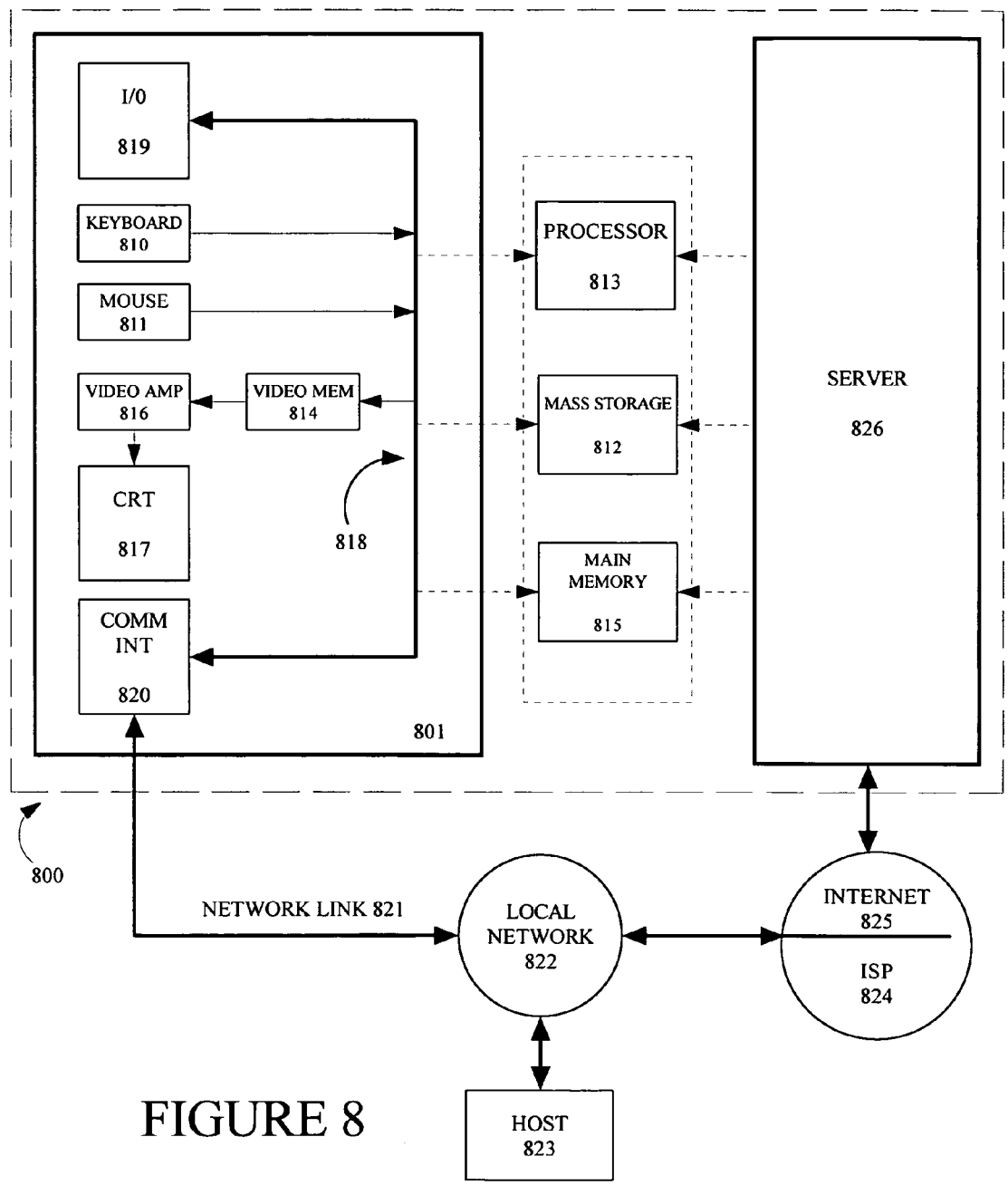
FIG. 8 is a block diagram of a general purpose computer.

An embodiment of the invention can be implemented as computer software in the form of computer readable program code executed in a general purpose computing environment such as environment 800 illustrated in FIG. 8. A keyboard 810 and mouse 811 are coupled to a system bus 818. The keyboard and mouse are for introducing user input to the computer system and communicating that user input to central processing unit (CPU) 813. Other suitable input devices may be used in addition to, or in place of, the mouse 811 and keyboard 810. I/O (input/output) unit 819 coupled to bi-directional system bus 818 represents such I/O elements as a printer, ANV (audio/video) I/O, etc.

Computer 801 may include a communication interface 820 coupled to bus 818. Communication interface 820 provides a two-way data communication coupling via a network link 821 to a local network 822. For example, if communication interface 820 is an integrated services digital network (ISDN) card or a modem, communication interface 820 provides a data communication connection to the corresponding type of telephone line, which comprises part of network link 821. If communication interface 820 is a local area network (LAN) card, communication interface 820 provides a data communication connection via network link 821 to a compatible LAN. Wireless links are also possible. In any such implementation, communication interface 820 sends and receives electrical, electromagnetic or optical signals which carry digital data streams representing various types of information.

Network link 821 typically provides data communication through one or more networks to other data devices. For example, network link 821 may provide a connection through local network 822 to local server computer 823 or to data equipment operated by ISP 824. ISP 824 in turn provides data communication services through the world wide packet data communication network now commonly referred to as the "Internet" 825. Local network 822 and Internet 825 both use electrical, electromagnetic or optical signals which carry digital data streams. The signals through the various networks and the signals on network link 821 and through communication interface 820, which carry the digital data to and from computer 800, are exemplary forms of carrier waves transporting the information.

Processor 813 may reside wholly on client computer 801 or wholly on server 826 or processor 813 may have its computational power distributed between computer 801 and server 826. Server 826 symbolically is represented in FIG. 8 as one unit, but server 826 can also be distributed between multiple "tiers". In one embodiment, server 826 comprises a middle and back tier where application logic executes in the middle tier and persistent data is obtained in the back tier. In the case where processor 813 resides wholly on server 826, the results of the computations performed by processor 813 are transmitted to computer 801 via Internet 825, Internet Service Provider (ISP) 824, local network 822 and communication interface 820. In this way, computer 801 is able to display the results of the computation to a user in the form of output.

Computer 801 includes a video memory 814, main memory 815 and mass storage 812, all coupled to bi-directional system bus 818 along with keyboard 810, mouse 811 and processor 813. As with processor 813, in various computing environments, main memory 815 and mass storage 812, can reside wholly on server 826 or computer 801, or they may be distributed between the two.

The mass storage 812 may include both fixed and removable media, such as magnetic, optical or magnetic optical storage systems or any other available mass storage technology. Bus 818 may contain, for example, thirty-two address lines for addressing video memory 814 or main memory 815. The system bus 818 also includes, for example, a 32-bit data bus for transferring data between and among the components, such as processor 813, main memory 815, video memory 814 and mass storage 812. Alternatively, multiplex data/address lines may be used instead of separate data and address lines.

In one embodiment of the invention, the microprocessor is manufactured by Intel, such as the 80×86 or Pentium-typed processor. However, any other suitable microprocessor or microcomputer may be utilized. Main memory 815 is comprised of dynamic random access memory (DRAM). Video memory 814 is a dual-ported video random access memory. One port of the video memory 814 is coupled to video amplifier 816. The video amplifier 816 is used to drive the cathode ray tube (CRT) raster monitor 817. Video amplifier 816 is well known in the art and may be implemented by any suitable apparatus. This circuitry converts pixel data stored in video memory 814 to a raster signal suitable for use by monitor 817. Monitor 817 is a type of monitor suitable for displaying graphic images.

Computer 801 can send messages and receive data, including program code, through the network(s), network link 821, and communication interface 820. In the Internet example, remote server computer 826 might transmit a requested code for an application program through Internet 825, ISP 824, local network 822 and communication interface 820. The received code may be executed by processor 813 as it is received, and/or stored in mass storage 812, or other non-volatile storage for later execution. In this manner, computer 800 may obtain application code in the form of a carrier wave. Alternatively, remote server computer 826 may execute applications using processor 813, and utilize mass storage 812, and/or video memory 815. The results of the execution at server 826 are then transmitted through Internet 825, ISP 824, local network 822 and communication interface 820. In this example, computer 801 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for block based image compression with multiple non-uniform block encodings is described in conjunction with one or more specific embodiments. The invention is defined by the following claims and their full scope and equivalents.

We claim:

1. A method for compressing an image by an image compression apparatus comprising:
   partitioning said image into a plurality of pixel blocks;
   decomposing each of said plurality of pixel blocks to generate a plurality of decomposed blocks;
   compressing each of said plurality of decomposed blocks to generate a plurality of compressed blocks;
   combining each of said plurality of compressed blocks to generate an output block;
   wherein said decomposing is optimized for each of said plurality of pixel blocks to reduce loss of image quality;
   and wherein compressing each of said plurality of decomposed blocks comprises:
      determining a best fit curve in a color space;
      storing two points of said best fit curve; and
      storing an index value for a first pixel value in said first pixel block wherein said index maps to a collection of possible colors.

2. The method of claim 1 wherein said collection of possible colors comprises:
   colors of said two points.

3. The method of claim 1 wherein said collection of possible colors comprises:
   an interpolated value wherein said interpolated value is on said best fit curve.

4. The method of claim 1 wherein said two points are 16-bit values.

5. The method of claim 1 wherein said index value is a 2-bit value.

6. The method of claim 1 wherein said two points are endpoints of said best fit curve.

7. The method of claim 1 wherein said first pixel value is an RGB value.

8. The method of claim 1 wherein said first pixel value is a YCrCb value.

9. A method for compressing an image by an image compression apparatus comprising:
   partitioning said image into a plurality of pixel blocks;
   decomposing each of said plurality of pixel blocks to generate a plurality of decomposed blocks;
   compressing each of said plurality of decomposed blocks to generate a plurality of compressed blocks;
   combining each of said plurality of compressed blocks to generate an output block;
   wherein said decomposing is optimized for each of said plurality of pixel blocks to reduce loss of image quality;
   and wherein optimization of each of said plurality of pixel blocks further comprises:
      compressing a first subset comprising of one or more decomposed blocks to generate a first compressed subset;
      decompressing said first compressed subset;
      feeding results of decompressing of first compressed subset to a decomposing device that changes the data value of a second subset comprising of one or more decomposed blocks different from first subset; and
      compressing the second subset.

10. A method for compressing an image by an image compression apparatus comprising:
    partitioning said image into a plurality of pixel blocks;
    decomposing each of said plurality of pixel blocks to generate a plurality of decomposed blocks;
    compressing each of said plurality of decomposed blocks to generate a plurality of compressed blocks;
    combining each of said plurality of compressed blocks to generate an output block;
    wherein said decomposing is optimized for each of said plurality of pixel blocks to reduce loss of image quality;
    wherein decomposing each of said plurality of pixel blocks further comprises:
       compressing a first subset comprising of one or more decomposed blocks to generate a first compressed subset;
       decompressing said first compressed subset;
       feeding results of decompressing of first compressed subset to a decomposer device that changes the data value of a second subset comprising of one or more decomposed blocks different from first subset to generate a new second subset;
       compressing said new second subset;
       decompressing said new second subset;
       feeding results of decompressing of new second subset to said decomposer device that changes the data value of said first subset; and
       repeating steps of compressing, decompressing, and feeding of said first subset and repeating steps of compressing, decompressing, and feeding of said new second subset until a threshold is achieved.

11. A method for compressing an image by an image compression apparatus comprising:
    partitioning said image into a plurality of pixel blocks;
    decomposing each of said plurality of pixel blocks to generate a plurality of decomposed blocks;
    compressing each of said plurality of decomposed blocks to generate a plurality of compressed blocks;
    combining each of said plurality of compressed blocks to generate an output block;
    wherein said decomposing is optimized for each of said plurality of pixel blocks to reduce loss of image quality;
    and wherein decomposing each of said plurality of pixel blocks further comprises:
       projecting an original block onto a predefined vector; and
       concurrently storing a magnitude of said original block in a first new block and subtracting said projected block from said original block.

12. A method for compressing an image by an image compression apparatus comprising:
    partitioning said image into a plurality of pixel blocks;
    decomposing each of said plurality of pixel blocks to generate a plurality of decomposed blocks;
    compressing each of said plurality of decomposed blocks to generate a plurality of compressed blocks;
    combining each of said plurality of compressed blocks to generate an output block;
    wherein said decomposing is optimized for each of said plurality of pixel blocks to reduce loss of image quality;
    wherein decomposing each of said plurality of pixel blocks further comprises:
       projecting an original block onto a predefined vector;
       storing a magnitude of said original block in a first new block;
       compressing said first new block to generate a compressed first block;

decompressing said compressed first block to generate a decompressed block;

subtracting data value of said decompressed block from data value of said original block to generate a new second block;

compressing said new second block to generate a compressed second block; and combining said compressed first block and said compressed second block.

13. An image compression system comprising:

a partitioner configured to partition an image into a plurality of pixel blocks;

a decomposer unit configured to decompose each of said plurality of pixel blocks to generate a plurality of decomposed blocks;

a compression unit configured to compress each of said plurality of decomposed blocks to generate a plurality of compressed blocks;

a combining unit configured to combine each of said plurality of compressed blocks to generate an output block;

wherein said decomposing is optimized for each of said plurality of pixel blocks to reduce loss of image quality;

and wherein said compression unit comprises:

a determiner configured to determine a best fit curve in a color space; and a storage device configured to store two points of said best fit curve, wherein said storage device is farther configured to store an index value for a first pixel value in said first pixel block wherein said index maps to a collection of possible colors.

14. The image compression system of claim 13 wherein said collection of possible colors comprises:

colors of said two points.

15. The image compression system of claim 13 wherein said collection of possible colors comprises:

an interpolated value wherein said interpolated value is on said best fit curve.

16. The image compression system of claim 13 wherein said two points are 16-bit values.

17. The image compression system of claim 13 wherein said index value is a 2-bit value.

18. The image compression system of claim 13 wherein said two points are endpoints of said best fit curve.

19. The image compression system of claim 13 wherein said first pixel value is an RGB value.

20. The image compression system of claim 13 wherein said first pixel value is a YCrCb value.

21. An image compression system comprising:

a partitioner configured to partition an image into a plurality of pixel blocks;

a decomposer unit configured to decompose each of said plurality of pixel blocks to generate a plurality of decomposed blocks;

a compression unit configured to compress each of said plurality of decomposed blocks to generate a pluraliw of compressed blocks;

a combining unit configured to combine each of said plurality of compressed blocks to generate an output block;

wherein said decomposing is optimized for each of said plurality of pixel blocks to reduce loss of image quality;

wherein optimization of each of said plurality of pixel blocks utilizes:

a first compressing unit configured to compress a first subset comprising of one or more decomposed blocks to generate a first compressed subset;

a decompressing unit configured to decompress said first compressed subset;

a feeding unit configured to feed results of decompression of first compressed subset to a decomposer device that changes the data value of a second subset comprising of one or more decomposed blocks different from the first subset; and a second compressing unit configured to compress the second subset.

22. An image compression system comprising:

a partitioner configured to partition an image into a plurality of pixel blocks;

a decomposer unit configured to decompose each of said plurality of pixel blocks to generate a plurality of decomposed blocks;

a compression unit configured to compress each of said plurality of decomposed blocks to generate a plurality of compressed blocks;

a combining unit configured to combine each of said plurality of compressed blocks to generate an output block;

wherein said decomposing is optimized for each of said plurality of pixel blocks to reduce loss of image quality;

wherein optimization of each of said plurality of pixel blocks utilizes:

a first compression unit configured to compress a first subset comprising of one or more decomposed blocks to generate a first compressed subset;

a first decompressing unit configured to decompress said first compressed subset;

a first feeding unit configured to feed results of decompressing of first compressed subset to a decomposer device that changes the data value of a second subset comprising of one or more decomposed blocks different from first subset to generate a new second subset;

a second compression unit configured to compress said new second subset;

a second decompressing unit configured to decompress said new second subset;

a second feeding unit configured to feed results of decompressing of new second subset to said decomposer device that changes the data value of said first subset; and a repeating unit configured to repeat steps of compress, decompress, and feed said first subset and repeating steps of compress, decompress, and feed said new second subset until a threshold is achieved.

23. An image compression system comprising:

a partitioner configured to partition an image into a plurality of pixel blocks;

a decomposer unit configured to decompose each of said plurality of pixel blocks to generate a plurality of decomposed blocks;

a compression unit configured to compress each of said plurality of decomposed blocks to generate a plurality of compressed blocks;

a combining unit configured to combine each of said plurality of compressed blocks to generate an output block;

wherein said decomposing is optimized for each of said plurality of pixel blocks to reduce loss of image quality;

wherein optimization of each of said plurality of pixel blocks utilizes:

a projection unit configured to project an original block onto a predefined vector; and a device configured to concurrently store a magnitude of said original block in a first new block and subtract said projected block from said original block.

24. An image compression system comprising:
a partitioner configured to partition an image into a plurality of pixel blocks;
a decomposer unit configured to decompose each of said plurality of pixel blocks to generate a plurality of decomposed blocks;
a compression unit configured to compress each of said plurality of decomposed blocks to generate a plurality of compressed blocks;
a combining unit configured to combine each of said plurality of compressed blocks to generate an output block;
wherein said decomposing is optimized for each of said plurality of pixel blocks to reduce loss of image quality;
wherein optimization of each of said plurality of pixel blocks utilizes:
  a projection unit configured to project an original block onto a predefined vector;
  a storing unit configured to store a magnitude of said original block in a first new block;
  a first compression unit configured to compress said first new block to generate a compressed first block;
  a decompression unit configured to decompress said compressed first block to generate a decompressed block;
  a subtracting unit configured to subtract data value of said decompressed block from data value of said original block to generate a new second block;
  a second compression unit configured to compress said new second block to generate a compressed second block; and
  a combining unit configured to combine said compressed first block and said compressed second block.

25. A method for compressing an image by an image compression apparatus comprising:
partitioning said image into a plurality of pixel blocks;
decomposing each of said plurality of pixel blocks to generate a plurality of decomposed blocks;
compressing each of said plurality of decomposed blocks to generate a plurality of compressed blocks;
combining each of said plurality of compressed blocks to generate an output block;
wherein said decomposing is optimized for each of said plurality of pixel blocks to reduce loss of image quality;
and wherein optimizing comprises conducting a series of functions on a first subset comprised of one or more decomposed blocks and applying the results to a second subset comprising of one or more decomposed blocks different from the ones in the first subset.

* * * * *

UNITED STATES PATENT AND TRADEMARK OFFICE
CERTIFICATE OF CORRECTION

| | | |
|---|---|---|
| PATENT NO. | : 7,643,679 B2 | Page 1 of 1 |
| APPLICATION NO. | : 10/778902 | |
| DATED | : January 5, 2010 | |
| INVENTOR(S) | : Iourcha et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this

Eighteenth Day of January, 2011

David J. Kappos
*Director of the United States Patent and Trademark Office*